United States Patent [19]
Schwab et al.

[11] Patent Number: 5,798,428
[45] Date of Patent: Aug. 25, 1998

[54] METHOD OF PREPARING POLYSILANES AND RESULTANT PRODUCTS

[75] Inventors: Stuart T. Schwab; Partha P. Paul, both of San Antonio, Tex.; Ryoichi Nishida, Nara, Japan

[73] Assignee: Osaka Gas Co., Ltd., Osaka, Japan

[21] Appl. No.: 710,752

[22] Filed: Sep. 20, 1996

[51] Int. Cl.$^6$ .................................................. C08G 77/08

[52] U.S. Cl. ........................... 528/14; 528/23; 528/10; 556/430

[58] Field of Search .................... 556/430; 528/14, 528/23, 10

[56] References Cited

U.S. PATENT DOCUMENTS

| | | | |
|---|---|---|---|
| 3,910,980 | 10/1975 | Nagai et al. | 260/448.8 R |
| 4,727,179 | 2/1988 | Nagai et al. | 556/430 |
| 4,965,386 | 10/1990 | Watson et al. | 556/430 |
| 5,252,766 | 10/1993 | Sakakura et al. | 556/430 |

*Primary Examiner*—Margaret W. Glass
*Attorney, Agent, or Firm*—John L. Sigalos

[57] ABSTRACT

There is disclosed a method of making polysilanes by polymerization of a silane in the presence of a catalyst comprising a phosphine-stabilized polyhydride of an early transition metal of Groups 4 to 7 of the Periodic Table and the resultant polysilanes which have a molecular weight higher than 1,000 and a polydispersity below about 2.

7 Claims, 2 Drawing Sheets

45 DEGREE (SiH, SiH₂, and SiH₃ in phase)

90 DEGREE (only SiH observed)

135 DEGREE (SiH and SiH₃ in phase, SiH₂ 180° out of phase)

45 DEGREE (SiH, SiH$_2$, and SiH$_3$ in phase)

90 DEGREE (only SiH observed)

135 DEGREE (SiH and SiH$_3$ in phase, SiH$_2$ 180° out of phase)

METHOD OF PREPARING POLYSILANES AND RESULTANT PRODUCTS

BACKGROUND OF THE INVENTION

The present invention relates to the preparation of polysilanes and to the resultant novel polymers.

It is known that polysilanes are useful in a wide range of applications, ranging from ceramic precursors to optoelectronic devices.

At the present time the technique for producing polysilanes, known as "Kipping's method" is based on the stoichiometric reaction of halosilanes with alkali metals. This process suffers from exceedingly poor reproducibility, is a batch process, and produces copious amounts of salt as a co-product and thereby is not suitable for large scale production.

Moreover, since the Kipping method utilizes alkali metals, in particular, hazardous sodium metal, it is difficult to use commercially, and also to use substituted silane monomers since many of the substituent groups react with sodium. In fact, several literature references disclose that introduction of substituents on the phenyl group of a polyphenlysilane demand extremely harsh reaction conditions which, in turn, can result in the rupture of the Si—Si bond.

Catalytic methods for the production of polysilanes have been reported in several papers and in U.S. Pat. No. 4,965,386, but the catalytic methods employed are either limited in their scope or not sufficiently efficient for the economic manufacture of polysilanes. For example, a titanium catalyst used to produce a poly(phenylsilane), results only in cyclohexa(phenylsilane) in 10% yield. Use of zirconium and hafnium catalysts also produce a mixture of cyclohexa(phenylsilane) and a linear poly(phenylsilane) with a polydispersity of about 2. In addition to the poor results, hafnium and zirconium metals are quite expensive. Other organometallic catalysts used to obtain polysilanes equally are not suitable. Again, they do not produce high molecular weight polyphenylsilanes and they are not capable of producing polysilanes with a polydispersity close to unity.

SUMMARY OF THE INVENTION

The present invention enables the production of polysilanes with a polydispersity close to unity, polysilanes of desired molecular weight much higher than 1,000, depending on the catalyst and reaction conditions, as hereinafter disclosed.

Briefly stated, the present invention comprises a method of making a polysilane comprising polymerizing a silane monomer of the formula $R_xSiH_{(4-x)}$ under anaerobic and anhydrous conditions at a temperature and for a time sufficient to form the polysilane in the presence of a catalyst comprising a phosphine-stabilized polyhydride of an early transition metal of Group 4 to 7 of the Periodic Table, wherein R is a substituted or unsubstituted alkyl, aryl, or alkylaryl group and X is 1 or 2.

The invention also comprises the resultant linear, unbranched polysilanes as hereinafter described and claimed.

DETAILED DESCRIPTION

Figure 1:
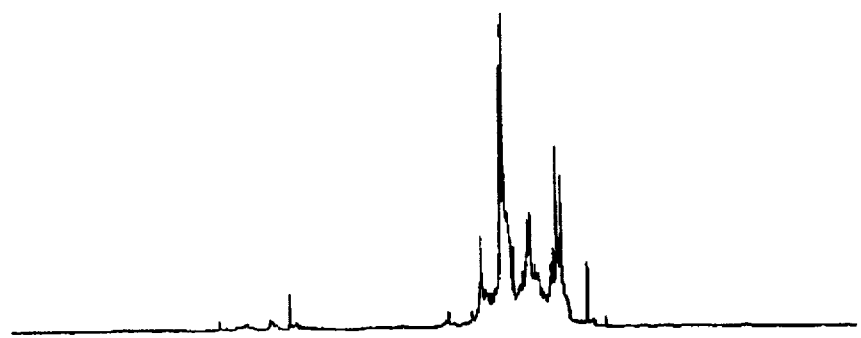
FIG. 1 are $^{29}$Si DEPT spectra of the polymeric products obtained using a tantalum catalyst under refluxing conditions, and FIG. 2 are also spectra of the same polymeric products obtained under forcing conditions.
Figure 1:
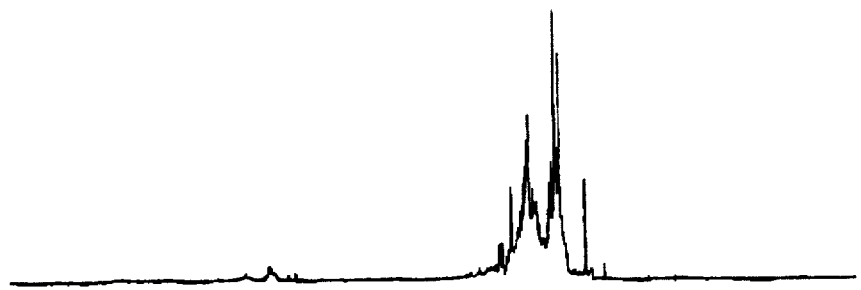
Figure 1:
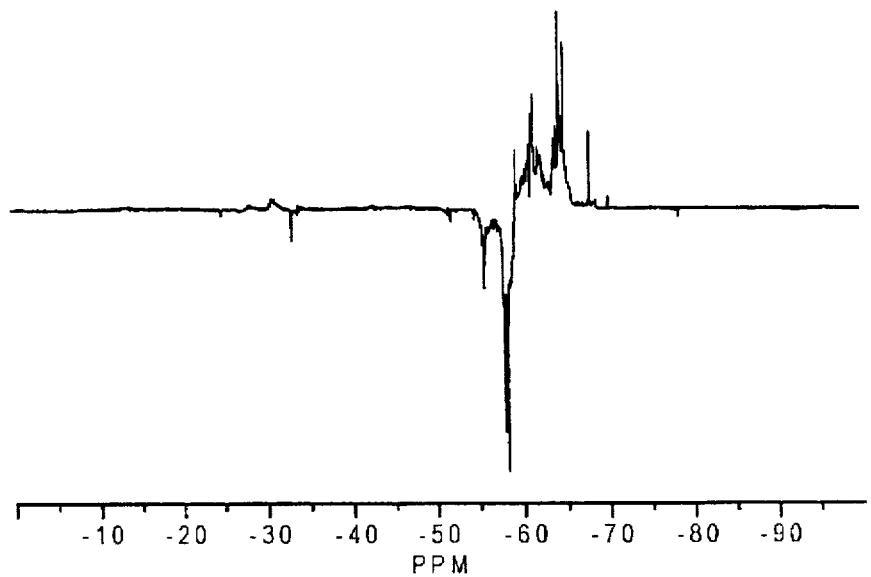

In carrying out the method of the instant invention, it is essential to utilize certain catalysts in the polymerization. These are phosphine-stabilized polyhydrides of early transition metals of Groups 4 to 7 of the new IUPAC notation of the Periodic Table of the elements. With respect to the specific metals, it is possible to utilize titanium, tantalum, niobium, rhenium, molybdenum, or any of the other early transition metals of the noted groups.

It is also important that the hydrides be phosphine-stabilized, preferably with 1,2 Bis(dimethylphosphino) ethane (dmpe) or 1, 2 Bis(diphenylphosphino) ethane (dppe) and the like. Other polydentate, bidentate (e.g., 1,2 Bis (diethylphosphino) ethane or monodentate phosphines (e.g., trimethylphosphine dimethylphosphine, and the like, can be utilized, but dmpe is preferred.

As in all polymerizations of silanes to form polysilanes, the reaction is carried out under rigorous anaerobic and anhydrous conditions.

The polymerization itself can either be carried out under reflux conditions, at slightly elevated pressure, as at 60° psi or higher, or under forcing conditions in which the reaction can be carried out in autoclaves at temperatures as high as 300° C., preferably 200° C. for a number of hours, for example 48 hours.

The polymerization can be carried out in a solvent or neat, with suitable solvents, including but not limited to pentane, heptane, hexane, benzene, toluene, diethyl ether, tetrahydrofuran, and the like.

The silane monomer to be polymerized is one having a formula $R_xSiH_{(4-x)}$, in which R is preferably a substituted or unsubstituted alkyl group, examples being phenyl and substituted phenyl groups, and in which X is either 1 or 2. It is preferred to use phenylsilane.

The resultant polymers of the instant invention have a polydispersity of less than 2 and can be close to unity with molecular weights higher than 1,000 amu. The molecular weight of the polysilanes can be tailored, depending upon the particular catalyst utilized, and also one does not obtain any of the undesired by-products as occurs in the Kipping process.

The invention will be further described in connection with the following examples which are set forth for purposes of illustration only.

EXAMPLES 1 TO 5

The catalysts were prepared as follows:

1. TaH$_5$(dmpe)$_2$ was prepared by the hydrogenation of TaMe$_5$(dmpe) using a modification of the method set forth in Schrock, *J. Organomet. Chem.*, 1976, 122, pp. 209–225. 3 g of TaMe$_5$ (dmpe) were dissolved in 15 mL of THF and then transferred to a high pressure stainless steel autoclave ("bomb") cooled to −50° C. Hydrogen gas was bubbled through the solution and 1.5 mL of 1,2 Bis (dimethylphosphino) ethane (dmpe) were added as an ether solution. The bomb was pressurized with 7300 psi of hydrogen and was heated at 60° C. for 18 hours. The mixture of brown solution and white solid was filtered and the filtrate was evaporated. The brown residue was extracted with 30 mL of hexanes, treated with activated charcoal and dried under vacuum to give a yellow solid TaH$_5$(dmpe)$_2$.

2. NbCl$_5$ was suspended in benzene. Ten equivalents of potassium and 5 equivalents of dmpe were added to the NbCl$_5$ suspension. This mixture was placed in a stainless steel bomb. The nitrogen atmosphere was changed by bubbling hydrogen through the cold (−40° C.) solution. The bomb was pressurized with 200 atm of $H_2$ and stirred overnight at 115° C. The black solution was evaporated and extracted with hexanes. Evaporation of the solvent yielded yellow $NbH_5$ $(dmpe)_2$.

3. An ether solution of $TiCl_4$ was reacted with $PhCH_2Br$ at −20° C. The red solution was filtered, evaporated and extracted with hexanes to yield a red solid, $Ti(CH_2Ph)_4$. Tetrabenzyltitanium was dissolved in benzene with 2.5 equivalents of dmpe, and the mixture was transferred to the bomb. The nitrogen atmosphere was changed by bubbling hydrogen through the cold (−40° C.) solution. The mixture was pressurized with 200 atm of $H_2$ and was allowed to stir overnight at room temperature. After removal from the bomb, the solution was filtered from the bomb, the solvent was evaporated after filtration, and the residue washed with hexanes to yield black $TiH_3(dmpe)$.

4. To a solution of $ReH_7(PPh_3)_2$ (2.0 g, 25 mmol) in 100 mL of THF, neat dmpe (0.6 mL, 3.6 mmol) was added. The mixture was stirred for 4 hours at room temperature. Addition of 100 mL of hexanes produced a white solid which was washed with 30 mL of diethyl ether and drying it in vacuo formed $ReH_7(dmpe)$.

5. Yellow crystalline $MoH_4(dppe)_2$ was prepared by the method reported by Crabtree and Hlatky, *Inorg. Chem.*, 1982, 21, 1273–75.

To a solution of dimethylphenylphosphine (3.6 mL, 25 mmol) in 60 mL of THF, solid $MoCl_4(THF)_2$(1.9 g, 5 mmol) was added and was refluxed for 30 minutes. The mixture was cooled to room temperature to which 65 mL of a 1M solution of $LiEt_3BH$ ("super hydride") in THF was added. The red mixture was stirred overnight. Excess super hydride was destroyed by careful addition of 10 mL of ethanol. Evaporating the solvent yielded a red oil. Addition of 100 mL of methanol gave a golden-yellow solution, to which 1, 2 Bis(dimethylphosphino)ethane [dmpe] (2 mL, 12.5 mmol) was added. The resulting yellow precipitate of $MoH_4$ $(dmpe)_2$ was washed twice with 10 mL of methanol and dried under vacuum.

EXAMPLES 6 TO 10

The catalysts made as set forth in Examples 1 to 5 were then used to polymerize phenylsilane monomer ($PhSiH_3$) under varying reaction conditions, i.e., room temperature, reflux, at 60 psig, and under forced conditions. The reaction conditions and results with each catalyst are set forth below.

6. Polymerization of Phenylsilane Using $TaH_5(dmpe)_2$.

a. Room Temperature

Fifteen mg of $TaH_5(dmpe)_2$ were dissolved in 15 mL of $PhSiH_3$. The pale yellow solution was stirred at room temperature for 18 hours without any indication of polymer formation.

b. Refluxing Conditions

Fifteen mg of (dmpe) $TaH_5$ were dissolved in 15 mL of $PhSiH_3$. The pale yellow solution was refluxed for 18 hours to form a light brown solution. Unreacted $PhSiH_3$ was removed under vacuum to yield a thick brown oil. When the neat reaction was allowed to reflux for seven days, a similar brown oil was formed.

c. 60 psi Reactions

These reactions were performed as described for refluxing conditions, except that the reactions were heated in Fischer-Porter Glass Pressure Vessels, (commonly known as "pop-bottles") until a pressure of 60 psig. was observed. The resulting polymers were brown oils.

d. Forcing Conditions

Thirty mg of $TaH_5$ $(dmpe)_2$ were dissolved in 30 mL of $PhSiH_3$ in a stainless steel autoclave. The reaction mixture was heated to 200° C. for 48 hours. A brittle colorless solid was obtained with some green solid impurities. The mixture of solids was dissolved in 70 mL of THF and 250 mL of hexanes was added, upon which a green solid precipitated. The solution was filtered, and 200 mL of hexanes was added to the filtrate, which resulted in the precipitation of a white solid. The solution was filtered a second time, and the filtrate was added to 400 mL of hexanes to yield a colorless sticky solid.

7. Polymerization Using $NbH_5(dmpe)_2$ a. Phenylsilane (10 mL) was added to 20 mg. of $NbH_5$ $(dmpe)_2$ and then heated to reflux for 7 days under nitrogen. The brown solution that resulted was filtered, and the unreacted silane was removed under vacuum to yield a brown oil.

b. 60 psig Conditions

A catalytic amount (20–25 mg) of was added to phenylsilane (15 mL). The solution was transferred to a glass pressure reaction vessel ("pop-bottle") in an argon filled glove-box. It was heated with stirring for four days while maintaining the pressure at approximately 60 psig (ca 150° C.). As it was believed hydrogen was formed as the reaction proceeded, the excess pressure above 60 psig was periodically released to remove some of the accumulated hydrogen. The resultant brown solution was filtered and excess of the monomer was removed under vacuum to yield a brown oil.

c. Forcing Conditions

A catalytic amount (20–25 mg) of $NbH_5(dmpe)_2$ was added to phenylsilane (15–20 mL). The solution was transferred to a stainless steel pressure reaction vessel ("bomb") in an argon filled glove-box. The solution was heated at 200° C. for 3 days during which time the pressure increased to 170 psig. The resulting thick paste was dissolved in toluene (75 mL). Addition of hexanes (300 mL) resulted in the precipitation of a small amount of brown solid. The colorless supernatant was filtered and additional hexanes (300 mL) were added to precipitate a white solid. This solid was washed with 50 mL of hexanes. The supernatant was removed under vacuum to produce a white gummy mass.

8. Polymerization Using $TiH_3(dmpe)$ a. Refluxing Conditions

Using a procedure similar to that described above for $NbH_5(dmpe)_2$ no evidence of polymerization was obtained after refluxing the monomer in the presence of $TiH_3(dmpe)_2$ for 7 days.

b. 60 psig Conditions

A brown oil was obtained using the same procedure described above for $NbH_5(dmpe)_2$.

c. Forcing Conditions

A gummy mass was obtained using a procedure similar to that described above for $NbH_5(dmpe)_2$.

9. Polymerization Using $ReH_7(dmpe)$ a. Refluxing Condition

Ten mL of Phenylsilane were added 50 20 mg. of $ReH_7$ (dmpe). It was refluxed for 7 days under nitrogen. No evidence of polymerization was obtained.

b. 60 psig Condition

A catalytic amount (20–25 mg) of $ReH_7(dmpe)$ was added to 15 mL of phenylsilane. The solution was poured into a glass pressure reaction vessel ("pop-bottle"). It was heated with stirring for 4 days while maintaining the pressure at 60 psig. A brown solution was obtained. It was filtered and the volatile impurities were removed under vacuum to produce a light brown oil.

c. Forcing Condition

Catalytic amount (20–25 mg) of ReH$_7$(dmpe) was added to 20–25 mL of Phenylsilane. The solution was poured into a stainless steel pressure reaction vessel. The solution was heated at 200° C. for 3 days while the pressure increased to 170 psig. A brittle solid resulted. This was dissolved in 75 mL of toluene. Nearly 200 mL of hexanes was added to precipitate a small amount of brown solid. The colorless supernatant was filtered and 400 mL of more hexanes were added to precipitate an off-white solid which was washed with 100 mL of hexanes and dried under vacuum.

10. Polymerization Using MoH$_4$(dppe)$_2$ a. Refluxing Condition 10 mL of phenylsilane was added to 20 mg. of MoH$_4$(dppe)$_2$. It was refluxed for 7 days under nitrogen. No evidence of polymerization was obtained.

b. 60 psig Condition

A catalytic amount (20–25 mg) of MoH$_4$(dmpe)$_2$ was added to 15 mL of phenylsilane. The solution was poured into a glass pressure reaction vessel ("pop-bottle"). It was heated with stirring for 4 days while maintaining the pressure at 60 psig. No evidence of polymerization was obtained.

c. Forcing Condition

Catalytic amount (20–25 mg) of MoH$_4$(dmpe)$_2$ was added to 20–25 mL of Phenylsilane. The solution was poured into a stainless steel pressure reaction vessel. The solution was heated at 200° C. for 3 days while the pressure increased to 170 psig. A brittle solid resulted.

This was dissolved in 75 mL of toluene. Nearly 200 mL of hexanes was added to precipitate a small amount of brown solid. The colorless supernatant was filtered and 200 mL of more hexanes were added to precipitate a white solid with yellow tinge which was washed with 50 mL of hexanes and dried under vacuum.

Gel permeation chromatography (GPC) was used to obtain the molecular weight of the polymers. The average molecular weights (M$_w$) of different polymers are summarized in Table I below.

The molecular weight of the monomer (phenylsilane) was found to be 95 amu by GPC measurements. This is 14% lower than the actual molecular weight of 108 amu. This difference may arise because of the use of polystyrene standards for calibration. Reliable polysilane standards are not available that could be more representative, and a better calibration of the instrument could be obtained. Notwithstanding this minor shortcoming, the GPC results confirm polysilane formation using a variety of catalysts.

TABLE I

| CATALYST | REACTION NUMBER (POLYMER M$_w$) | | | |
|---|---|---|---|---|
| | Room Temperature | Reflux | 60 psig | Forcing Conditions |
| TaH$_5$(dmpe)$_2$ | — | 232 | — | 650 |
| NbH$_5$(dmpe)$_2$ | — | 290 | 1,165* | 1,970 |
| TiH$_3$(dmpe) | — | — | NA | 600 |
| ReH$_7$(dmpe) | — | — | NA | 1,028 |
| MOH$_4$(dmpe)$_2$ | — | — | — | 1,460 |

— = No polymer obtained
NA = Not Analyzed
*= Large amount of lower molecular weight material also present With the tantalum catalyst, the M$_w$ from the GPC trace of polymer obtained under reflux conditions corresponds is 232 g/mol, which, based on a "GPC" molecular weight of 95 g/mol for the PhSiH$_3$ monomer, corresponds to a polymer containing 2–3 Si units. The solid obtained under forcing conditions shows a peak maximum that corresponds to a molecular weight of 689 g/mol, which, based on a "GPC" molecular weight of 95 g/mol for the PhSiH$_3$ monomer, corresponds to a polymer containing 7 Si units, in good agreement with the molecular weight expected from the FTIR spectral data.

Figure 2:
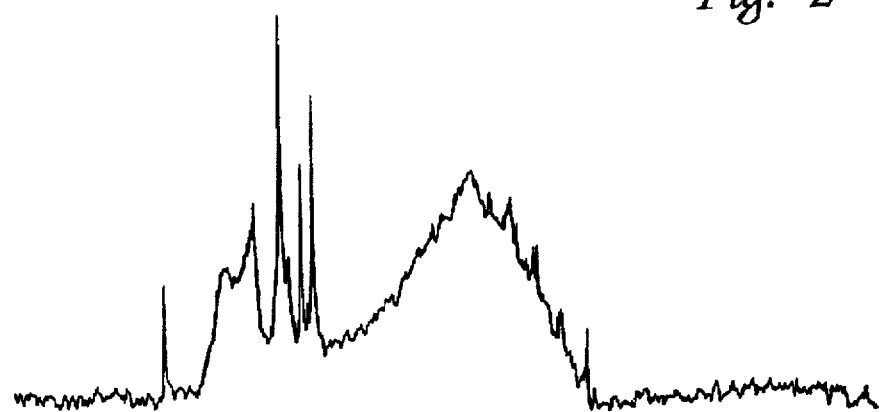
Figure 2:
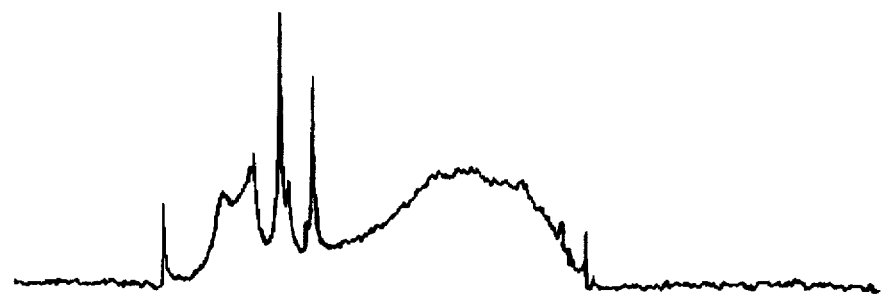
Figure 2:
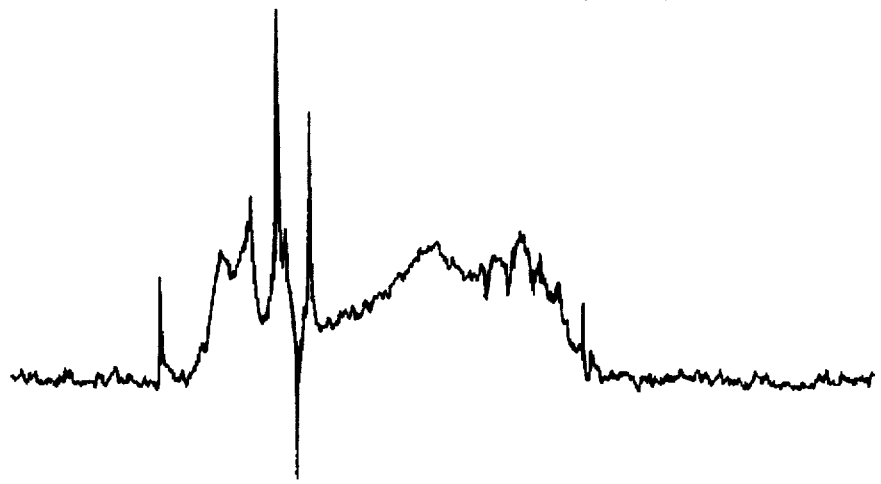
Figure 2:
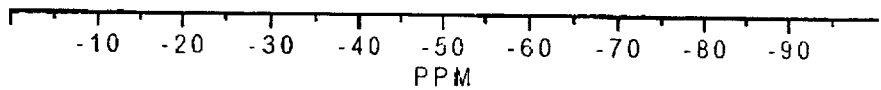

The polymeric products obtained under refluxing and forcing conditions using the tantalum catalyst were examined by Nuclear Magnetic Resonance (NMR) spectroscopy. The $^1$H NMR and $^{29}$Si NMR spectra of the material obtained under refluxing conditions are consistent with a relatively low molecular weight product. Using DEPT ("Distortionless Enhancement by Polarization Transfer") techniques, the material of Example 6 is seen to contain roughly equal amounts of SiH and SiH$_2$ functions (FIG. 1), which is consistent with a low molecular weight polymer. The SiH$_2$ functions can only be present as end groups, and their presence indicates that the polymer product is linear, not cyclic. The $^{29}$Si DEPT analysis of the material produced under forcing conditions (FIG. 2) shows that the material contains a far lower proportion of SiH$_2$ functions, which is consistent with a higher molecular weight material. While the proportion of SiH$_2$ functions is reduced, these functions are still present, and can only be present at the termination of linear regions of the polymer. Although the polymers may be branched, or may contain some cyclic regions, the $^{29}$Si DEPT analysis clearly indicates that the polymers produced with these polyhydride catalysts are largely linear.

The most significant result was obtained while using NbH$_5$(dmpe)$_2$ as catalyst under forcing condition. A mixture of three distinct polysilanes was obtained from this reaction. The peak maxima represent polysilanes with molecular weights of 975, 2500 and 7,000 amu. The average molecular weight (M$_w$) is 1,970 amu with a polydispersity value of 1.8. A polysilane with M$_w$ value of 1,970 corresponds to a polymer consisting of approximately 21 monomeric units, based on the "GPC" molecular weight of 95 amu for the PhSiH$_3$ monomer. The 60 psig "pop bottle" reaction also produces a mixture of polymers. The peak associated with the highest molecular weight polysilane represents an average molecular weight of 1,165. The average molecular weight (M$_w$) of the oligomer silane produced under refluxing condition is 290 amu, which is similar to that of the oligomer obtained with TaH$_5$(dmpe)$_2$ under similar condition.

A white gum-like substance is formed from the forcing condition reaction of PhSiH$_3$ with TiH$_3$(dmpe) which has an M$_w$ of 600 amu. It has a low polydispersity value of 1.37. The M$_w$ of 600 amu represents a oligomer with 6 Si units, based on the "GPC" molecular weight of 95 for the PhSiH$_3$ monomer. Solid polysilanes were obtained when the polymerization reactions were carried out under forcing conditions using (dmpe)$_2$MoH$_4$ and (dmpe)ReH$_7$ as catalysts. Polymerization of phenylsilane catalyzed by ReH$_7$(dmpe) under forcing condition forms a polysilane with M$_w$=1,028 amu with a polydispersity value of 1.33. A polysilane with an M$_w$ of 1,028 amu represents an oligomer with 11 Si units, based on the "GPC" molecular weight of 95 amu for the PhSiH$_3$ monomer. Better results were obtained when MoH$_4$(dmpe)$_2$ is used as the catalyst under forcing condition. Average molecular weight (M$_w$) has been determined to be 1,460 amu with a polydispersity value of 1.43 which represents a polymer with 15 Si units.

These GPC analyses indicate that transition metal polyhydrides produce polysilanes with substantially higher molecular weights than are obtained from other metal catalysts described in the literature. The $^{29}$Si DEPT analyses demonstrate that the polymeric products are largely, if not entirely, linear.

The linearity of the polymers provides the product with substantial advantages over the largely cyclic products obtained with the other catalysts described earlier. Linear polymers generally exhibit superior film forming properties, and can be more readily crosslinked to form infinite solids. If properly aligned and oriented, linear polysilanes may exhibit anisotropic mechanical and/or electrical properties. For example, the aligned material may exhibit substantially higher electrical or photonic conductivity along the axis of orientation. These and other properties make the linear polysilanes produced through catalysis with polyhydrides more desirable than their polycyclic counterparts. The DEPT analyses indicate that the instant polysilanes are linear and unbranched.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of making a linear, unbranched polysilane comprising polymerizing a silane monomer of the formula $R_xSiH_{(4-x)}$ under anaerobic and anhydrous conditions at a temperature and pressure and for a time sufficient to form said polysilane in the presence of a catalyst comprising a phosphine-stabilized polyhydride of an early transition metal of Group 4 to 7 of the Periodic Table, wherein R is a substituted or unsubstituted alkyl, aryl, or alkylarly group and X is 1 or 2.

2. The method of claim 1 wherein the polyhydride of an early transition metal is a titanium, tantalum, niobium, rhenium, or molybdenum polyhydride.

3. The method of claim 2 wherein said phosphine is a mono-, bi-, or polydentate phosphine.

4. The method of claim 3, wherein said phosphine is 1,2 Bis(dimethylphosphino) ethane or 1,2 Bis (diphenylphosphino) ethane.

5. The method of claim 1 wherein the reaction is carried out under reflux conditions, slightly elevated pressure, or forcing conditions.

6. The method of claim 4 wherein the reaction is carried out under reflux conditions, slightly elevated pressure, or forcing conditions.

7. The method of claim 1 wherein the silane monomer is a phenylsilane.

* * * * *